(No Model.)

W. W. MARSDEN.
SEEDING MACHINE.

No. 515,243. Patented Feb. 20, 1894.

WITNESSES
Geo. M. Anderson
Phill C Masi

INVENTOR
Wm. W. Marsden,
by E. W. Anderson
his Attorney

United States Patent Office.

WILLIAM WEBSTER MARSDEN, OF BALTIMORE, MARYLAND, ASSIGNOR OF ONE-HALF TO CHARLES THOMAS MARSDEN, OF SAME PLACE.

SEEDING-MACHINE.

SPECIFICATION forming part of Letters Patent No. 515,243, dated February 20, 1894.

Application filed November 1, 1893. Serial No. 483,768. (No model.)

*To all whom it may concern:*

Be it known that I, WILLIAM WEBSTER MARSDEN, a citizen of the United States, and a resident of Baltimore, in the State of Maryland, have invented certain new and useful Improvements in Hoppers for Seed-Sowing Machines; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
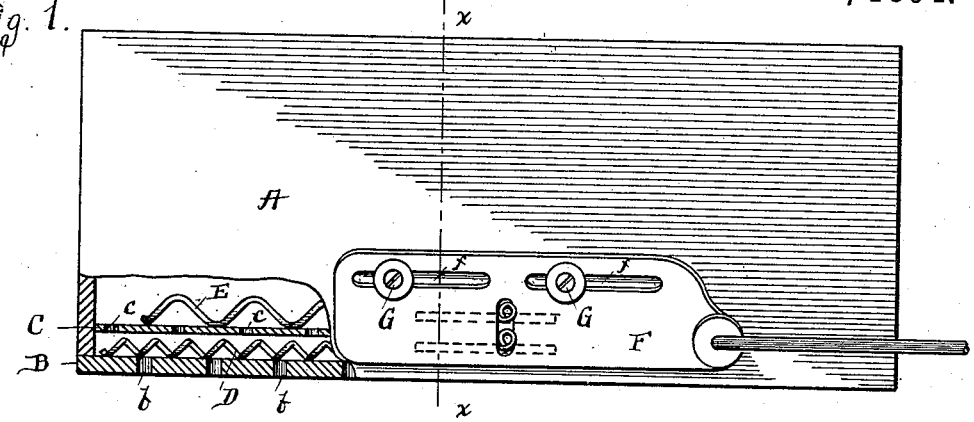
Figure 2:
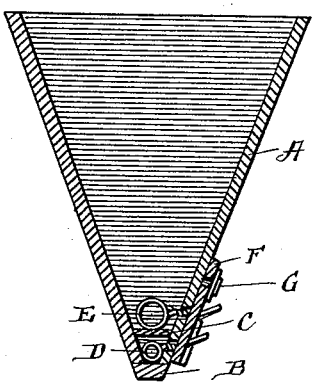

Figure 1 of the drawings is a side elevation partly broken away and Fig. 2 is a vertical section taken on line $x\ x$ Fig. 1.

This invention has relation to certain new and useful improvements in hoppers for seed sowing machines, and it consists in the novel construction and combination of parts, all as hereinafter described and pointed out in the appended claims.

The object of the invention is to provide a hopper particularly designed for sowing seeds of a fine and light nature, such as orchard grass and other grass seeds, which, owing to their extreme lightness and shape which cause them to pack or choke are difficult to distribute evenly from a hopper.

Referring to the accompanying drawings, illustrating my invention, the letter A designates the hopper, which is of the usual oblong, converging form, and designed to be supported in any well known and suitable manner upon the frame of the machine.

The two longitudinal sides of the hopper converge to within a short distance of each other, and are joined by two bottoms B and C, one a short distance above the other. Formed through the lower bottom B of the hopper are a series of perforations $b$, a similar but non-registering series of perforations $c$ being formed through the upper bottom C. Placed between the two bottoms is a feeder or agitator D which preferably consists of a spiral extending longitudinally of the hopper. Above the upper bottom C is a second feeder or agitator E, which is preferably similar to the device D. Connected to the central portions of these feeders or agitators, through elongated slots in the side of the hopper, is a plate F having slots $f$ which loosely engage bolts or studs G projecting from the hopper, and upon which the said plate is adapted to reciprocate. The said plate is designed to be connected by any suitable means (not shown) with a running part of the machine to actuate it to a regular or irregular reciprocating movement thereby causing a corresponding reciprocation of the devices D and E.

As above indicated, the light fluffy character of the seeds causes them to choke or pack in the bottom of the hopper which without the action of the agitator E would prevent their feeding through the openings $c$ and $b$. The reciprocation of the said agitator E, however, prevents any occurrence of this character by keeping the seeds constantly in motion.

Owing to the non-registering arrangement of the openings $b$ and $c$, the seeds are prevented from falling through when the machine is stopped. The agitator D when in motion serves to feed the seeds from the openings $c$ to the openings $b$.

Having described my invention, what I claim as new, and desire to secure by Letters Patent, is—

1. The combination with a hopper having a double bottom formed with openings therethrough, of an agitator or feeder situated within said double bottom, a second feeder or agitator situated above said bottom, and a reciprocating plate connected to the central portions of said agitators or feeders through elongated slots in the side of said hopper, substantially as specified.

2. In a hopper, the combination with the two bottoms formed with non-registering perforations therethrough, of the agitators one between and one above said bottoms, said agitators or feeders comprising each a spiral rod, substantially as specified.

In testimony whereof I affix my signature in presence of two witnesses.

WILLIAM WEBSTER MARSDEN.

Witnesses:
GEORGE H. PARMELEE,
PHILIP C. MASI.